E. A. HILL.
Galvanic Battery.
No. 39,571.
Patented Aug. 18, 1863.
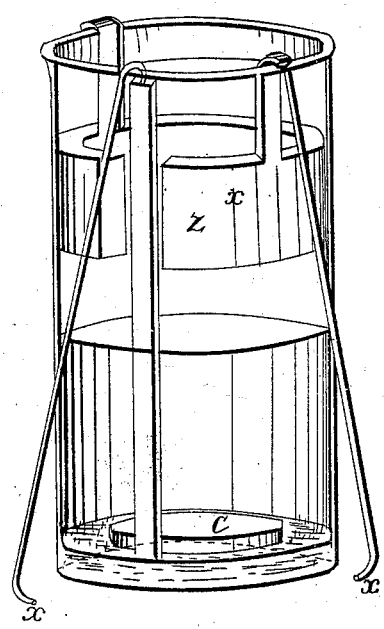

UNITED STATES PATENT OFFICE.

EDWARD A. HILL, OF GALESBURG, ILLINOIS.

IMPROVEMENT IN GALVANIC BATTERIES.

Specification forming part of Letters Patent No. 39,571, dated August 18, 1863; antedated April 9, 1862.

*To all whom it may concern:*

Be it known that I, EDWARD A. HILL, of Galesburg, in the county of Knox and State of Illinois, have invented a new and Improved Galvanic Battery; and I do hereby declare that the following is a full and exact description thereof, reference being to the accompanying drawing, forming part of this specification, in which the figure is a single cell of my battery in perspective, and to the letters of reference marked thereon.

The nature of my invention consists in so arranging the elements of the battery that the negative metal is placed in the bottom of, or low down in, the containing vessel, immersed in a saturated or strong solution of a salt of said negative metal—as sulphate of copper when copper is the negative metal—while the positive metal is suspended near the top of the vessel, immersed in a more or less dilute saline solution, but which may or may not be at first a solution of a salt of the positive metal, the difference in the specific gravity of the two fluids determining a corresponding difference in the positions, the greater specific gravity assuming the lower and the lesser specific gravity the higher local position, thereby dispensing with a porous cup or partition, and at the same time securing greater activity to the galvanic current, preventing, in a great measure, the reduction of the negative on and coating the positive metal, and maintaining the positive and negative metals in local positions most suitable to accomplish the best results.

To enable others skilled in the art to make and use my invention, I will proceed to describe its construction and operation. And to avoid prolixity, I will in this description instance as elements those which are used in a "Daniells battery," so called, viz., zinc and its sulphate in solution (positive) and copper and its sulphate in crystals and in solution, (negative,) though other elements may be used in a similar manner.

I take a vessel of such form that there may be considerable depth of fluids contained, more or less, according to the size and form of plates used, and, having nearly filled it with a strong but not saturated solution of sulphate of zinc, or of common salt, place the copper plate on or near the bottom of the vessel, a protected conductor or pole being attached thereto and running upward and out of the vessel.

The position of the negative plate is shown at C in the accompanying drawing, and its pole by the character +; or, where not much quantity of current and a series of cups is required, the negative plate may be a mere strip dipping down to the bottom of the vessel. In this case, that portion of it passing through the superior half of the zinc solution must be protected from corrosion or an incorrosible metal, as lead, may be used. I next drop into the solution in the vessel, gently but quickly, so as to stir the solution as little as possible, a quantity of the crystals of sulphate of copper. These sinking to the bottom, dissolve, and the solution becomes the negative exciting-fluid. Care must be taken that this solution is never stirred so as to cause it to rise and come in contact with the zinc plate above. Lastly, I suspend the zinc plate, (Z in the drawing,) by any convenient means, in the top of the sulphate-of-zinc solution, and entirely above the sulphate-of-copper solution, attaching a conductor thereto, (its pole represented by the character — in the drawing;) or, as before, where not much quantity but intensity and a series of cups is required, I solder directly to the zinc plate of one vessel one end of the strip, protected, or of incorrosible metal, and allow the other end to dip to the bottom of the next vessel in the battery, the first zinc and last copper in the series, of course, excepted; or, still easier and simpler, I have constructed a battery of fifty-one cups by soldering one end of a strip of sheet-lead to the zinc and projecting the other end quite down to the bottom of the next adjoining cup, the reduction of the copper onto the depending end soon covering and practically converting it into a copper plate. Thus, by the peculiar local position and arrangement of the several elements, each plate of the battery has its pabulum surrounding and in contact with itself.

The operation I suppose to be as follows—that is to say: Taking the form of battery I have here used as illustration, the poles being united or connected, the oxygen of the water combines with zinc, forming oxide of zinc, which sulphuric acid of the sulphate of copper combines with forming sulphate of zinc in solution. Simultaneously hydrogen freed from its oxygen unites with oxygen of the oxide of copper, forming water, and metallic copper is deposited on the negative plate. As long as any undissolved crystals of sulphate of copper remain in the bottom of the vessel the new-formed water goes to dissolve them; but when no more remain to dilute the solution, it is, therefore, necessary to add solid sulphate of copper from time to time. It is also necessary to draw off as it becomes nearly saturated the solution of sulphate of zinc from the top, replacing it with fresh water.

I do not claim or confine myself to any particular elements, whether of metals or salts; but

What I claim is—

The peculiar local positions of the elements with reference to each other and the use of two or more saline solutions without a porous partition to separate them, substantially as set forth.

EDWARD A. HILL.

Witnesses:
 AUGUSTINE G. HIBBARD,
 THOS. A. E. HOLCOMB.